US011830304B2

(12) United States Patent
Li

(10) Patent No.: US 11,830,304 B2
(45) Date of Patent: Nov. 28, 2023

(54) ANTI-SNEAK SHOOTING APPARATUS FOR A COMMUNICATION DEVICE WITH SHOOTING FUNCTION AND A SYSTEM FOR THE SAME

(71) Applicant: Ningbo Signatronic Technologies, Ltd., Zhejiang (CN)

(72) Inventor: Lin Li, Zhejiang (CN)

(73) Assignee: Ningbo Signatronic Technologies, Ltd., Ningbo (CN)

( * ) Notice: Subject to any disclaimer, the term of this patent is extended or adjusted under 35 U.S.C. 154(b) by 67 days.

(21) Appl. No.: 17/577,398

(22) Filed: Jan. 18, 2022

(65) Prior Publication Data

US 2022/0139135 A1 May 5, 2022

Related U.S. Application Data

(63) Continuation of application No. PCT/CN2019/096598, filed on Jul. 18, 2019.

(51) Int. Cl.
*G07C 9/00* (2020.01)
*G07C 9/28* (2020.01)

(52) U.S. Cl.
CPC ........... *G07C 9/00309* (2013.01); *G07C 9/28* (2020.01); *G07C 2009/00769* (2013.01)

(58) Field of Classification Search
CPC .............. G07C 9/00309; G07C 9/28; G07C 2009/00769; G07C 9/00; A45C 11/00; A45C 2011/002; H04M 1/02; G06B 17/12
USPC .......................................................... 340/5.61
See application file for complete search history.

(56) References Cited

U.S. PATENT DOCUMENTS 4,075,642 A * 2/1978 Niggeloh ............... G03B 17/04
396/424
6,659,274 B2 * 12/2003 Enners .................. G06F 1/1626
206/811
7,907,394 B2 * 3/2011 Richardson ........... G06F 1/1613
361/679.02

(Continued)

FOREIGN PATENT DOCUMENTS

WO 0245042 A1 6/2002

OTHER PUBLICATIONS

Jin Heng, Focus on class: Foreign schools start using magnetic locking bags to make students play with their phones less, available at URL: https://www.ithome.com/0/408/054.htm, Jan. 31, 2019.

(Continued)

*Primary Examiner* — Nam V Nguyen

(57) ABSTRACT

Provided herein is an anti-sneak shooting apparatus for a communication device with shooting function and a system thereof. The anti-sneak shooting apparatus comprises a case for receiving the communication device and a locking apparatus. The case has an opening disposed thereon, through which the communication device is put into and removed out of the case and an opaque region for aligning with a camera of the communication device that is put into the case. The locking apparatus is disposed on the case, for locking and unlocking the opening. The apparatus further comprises an anti-theft tag or a RFID tag disposed on the case. The detection system as provided herein is disposed at the exit of the place where shooting is prohibited and can be used in combination with the video supervision.

17 Claims, 4 Drawing Sheets

(56) References Cited

U.S. PATENT DOCUMENTS

| | | | |
|---|---|---|---|
| 9,729,187 B1* | 8/2017 | Adelmann | H04M 1/185 |
| 9,866,255 B1* | 1/2018 | Ketter-Muldrow | A45C 11/00 |
| 10,095,287 B2* | 10/2018 | Myers | G06F 1/1656 |
| 10,159,320 B2* | 12/2018 | Armstrong | A45C 13/008 |
| 10,896,559 B2* | 1/2021 | Werner | G06F 1/1626 |
| 2011/0073608 A1* | 3/2011 | Richardson | A45F 5/00 |
| | | | 220/737 |
| 2021/0054664 A1* | 2/2021 | Napthine | E05B 73/0017 |

OTHER PUBLICATIONS

International Search Report of PCT Patent Application No. PCT/CN2019/096598 dated Apr. 22, 2020.

\* cited by examiner

ANTI-SNEAK SHOOTING APPARATUS FOR A COMMUNICATION DEVICE WITH SHOOTING FUNCTION AND A SYSTEM FOR THE SAME

CROSS REFERENCE TO RELATED APPLICATIONS

The present application is a Continuation Application of PCT Application No. PCT/CN2019/096598 filed on Jul. 18, 2019, the contents of which are incorporated herein by reference in their entirety.

FIELD OF THE INVENTION

The present disclosure relates to accessories for communication devices, more particularly, to an anti-sneak shooting apparatus for a communication device with shooting function and a system for the same.

BACKGROUND OF THE INVENTION

In our work and daily life, cell phones become indispensable with more added functions. However, in certain circumstances, it is not allowable to perform shooting function by cell phones to avoid potential loss. For example, it is not allowable to perform shooting by cell phones in cinemas or theaters and the like in the purpose of protection of copyrights. It is also not allowable to perform shooting by cell phones in museums and exhibition halls. It is still not allowable to perform shooting by cell phones to certain devices, information and resources as trade secrets in certain business enterprises, institutes, companies and the like to protect various intangible intellectual properties of the owners.

In order to avoid the sneak shooting in the above circumstances, current solution is: At the entrance of certain places where shooting is prohibited, the cell phones have to be deposited in a specified location. At the exit of the said places, the cell phones then got be returned. Unfortunately, such solution gave poor experience to visitors or employees because this would also prohibit them to use cell phone's communication function for hours while in the premises. Consequently, it is always difficult to set mandatory requirement for depositing cell phones at the entrance of certain controlled places. However, some people may carry their cell phones and still perform sneak shooting without consideration of rules about not allowing to perform shooting, which results in leakage of trade secrets, copyrights, creative designs and solutions and in turn leads to invaluable loss much more than tangible assets' loss for business enterprises, institutes, companies and even individuals such as designers, authors, artists and the like. To date, there is no good means to avoid sneak shooting by cell phones in the places where shooting can be firmly prevented meanwhile avoiding bad emotional experience from visitors or employees for their frustration on inability to use communication functions and anxiety or resentment for the private item being taken away from own controls while in the premises.

In more detailed reasoning below, above mentioned current solution has following disadvantages:

1. If it needs to deposit the cell phones in a specified location when the people go into a place where shooting is prohibited, the cell phone's users may have concern whether their private information will be stolen due to lack of safeguard. Therefore, there is poor experience for depositing the cell phone in a specified location and people are reluctant to deposit their cell phones.
2. If people stay in the place where shooting is prohibited for a long period, and their cell phones are deposited in a specified location, they cannot timely receive important messages or phone calls, which may result in poor results. For example, the user of the cell phone may miss an important phone call about business information or an emergency phone call from family member, or the user of the cell phone may miss a phone call, which may result in missing business opportunities or producing family troubles, or the user of the cell phone may miss a timely public alarm message (such as vital alarm messages for earthquake warning on how many seconds left for the wavefront to arrive).

SUMMARY OF THE INVENTION

In one aspect, provided herein is an anti-sneak shooting apparatus for a communication device with shooting function and a system for the same, which can avoid poor experience rendered due to deposition of communication devices and allow the users of the communication devices to timely receive messages and phone calls via their communication devices.

In one embodiment, provided herein is an anti-sneak shooting apparatus for a communication device with shooting function, comprising:

a case, for receiving the communication device without interfering the communication function thereof, having an opening disposed thereon, through which the communication device is put into and removed out of the case, and an opaque region disposed thereon, for covering a camera of the communication device that is put into the case; and a locking apparatus disposed on the case, for locking and unlocking the opening.

In one embodiment, the anti-sneak shooting apparatus further comprises a tag to be detected, which is disposed on the case and can be detected by a preset detection system when it enters into a detection area of the preset detection system.

In one embodiment, the case further comprises a transparent region for aligning with a display screen of the communication device that is put into the case.

In one embodiment, the transparent region is made of touchable transparent materials.

In one embodiment, the touchable transparent materials are touchable plastic films.

In one embodiment, the anti-sneak shooting apparatus further comprises a fastening apparatus disposed within the case, for fixing the communication device in the case so as to make the camera of the communication device be accurately covered by the corresponding opaque region.

In one embodiment, the case has a display window disposed thereon, for aligning with a display screen of the communication device that is put into the case.

In one embodiment, the communication device has a front camera and a rear camera, and the case has two opaque regions for respectively aligning with front camera and the rear camera of the communication device that is put into the case.

In one embodiment, the case is an opaque and soft non-metal case.

In one embodiment, the case is a non-metal transparent case with an opaque patch adhered to an inner side of the case and defining the opaque region.

In one embodiment, the case is provided with button holes for aligning with the buttons of the communication device that is put into the case.

In one embodiment, the case is provided with a speaker hole, for aligning with a loudspeaker of the communication device that is put into the case.

In one embodiment, the locking apparatus is an electromagnetic locking apparatus or a mechanical locking apparatus.

The tag is an acousto-magnetic (AM) anti-theft tag, a radio frequency (RF) tag or an electromagnetic (EM) tag.

In another embodiment, provided herein is an anti-sneak shooting apparatus for a communication device with shooting function, comprising:
 a case for receiving the communication device without interfering the communication function of the communication device, having an opening disposed thereon, through which the communication device is put into and removed out of the case, wherein the case is a rigid case; and
 a locking apparatus disposed on the case, for locking and unlocking the opening.

In still another embodiment, provided herein is an anti-sneak shooting apparatus for a communication device with shooting function, comprising:
 a case for receiving the communication device without interfering the communication function thereof, having an opening through which the communication device is put into and removed out of the case, and an opaque region disposed thereon, for covering a camera of the communication device that is put into the case;
 a locking apparatus disposed on the case, for locking and unlocking the opening; and
 a tag to be detected, which is disposed on the case and can be detected by a preset detection system when it enters into a detection area of the preset detection system.

In yet another embodiment, provided herein is an anti-sneak shooting apparatus for a communication device with shooting function, comprising:
 a case for receiving the communication device without interfering the communication function of the communication device, having an opening disposed thereon, through which the communication device is put into and remove out of the case, wherein the case is a rigid case;
 a locking apparatus disposed on the case, for locking and unlocking the opening; and
 a tag to be detected, which is disposed on the case and can be detected by a preset detection system when it enters into a detection area of the preset detection system.

In yet another embodiment, provided herein is an anti-sneak shooting system for a communication device with shooting function, comprising: a tag detection system and the anti-sneak shooting apparatus as mentioned above, wherein the tag detection system is used to detect the presence of the tag to be detected in a detection area.

In one embodiment, the tag is a radio frequency tag and the tag detection system is a RFID tag detection system which is used for detecting the presence of the radio frequency tag and a user identification carried by the said tag.

By using the anti-sneak shooting apparatus for a communication device with shooting function and the system for the same as provided herein, the users of the communication devices could carry their communication devices with them to go into places where shooting is prohibited, without depositing the communication devices in a specified location, so as to improve experience in these places. Since the users could carry their communication devices with them, messages and the phone calls sent to their communication devices can be timely noticed, so as to avoid missing of messages and the phone calls, the loss rendered due to missing of messages and the phone calls can be avoided. In addition, the tag disposed on the case of the anti-sneak shooting apparatus will lead to effective collection of the anti-sneak shooting apparatus, for ease of organizing the anti-sneak shooting apparatus. In contrast, in places where shooting is prohibited, if no anti-sneak shooting apparatus is used, the communication devices have to be deposited in a specified location, and when leaving the said places, the users of the communication devices need to find their devices depending on the names used when depositing them. This may result in huge workload and chaos.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

REFERENCE NUMERALS

| 1: case | 10: opening | 11: opaque region |
|---|---|---|
| 12: transparent region | 13: button hole | 14: speaker hole |
| 2: locking apparatus | 20: plate | 21: key-lock |
| 3: tag to be detected | 8: elastic bar | 80: sloped face |
| 81: top | 9: communication device | 90: camera |
| 91: display screen | 92: button | 93: loudspeaker |

DETAILED DESCRIPTION OF THE INVENTION

Several aspects of the invention are described below with reference to examples for illustration. It should be understood that numerous specific details, relationships, and methods are set forth to provide a full understanding of the invention, rather than limit the scope of the present invention. The scope of the present invention is limited by the appended claims. One having ordinary skill in the relevant art, however, will readily recognize that the invention can be practiced without one or more of the specific details or with other methods.

The terminologies used herein are for the purpose of describing particular embodiments only and are not intended to be limiting of the invention. As used herein, the singular forms "a", "an" and "the" are intended to include the plural forms as well, unless the context clearly indicates otherwise.

Figure 1:
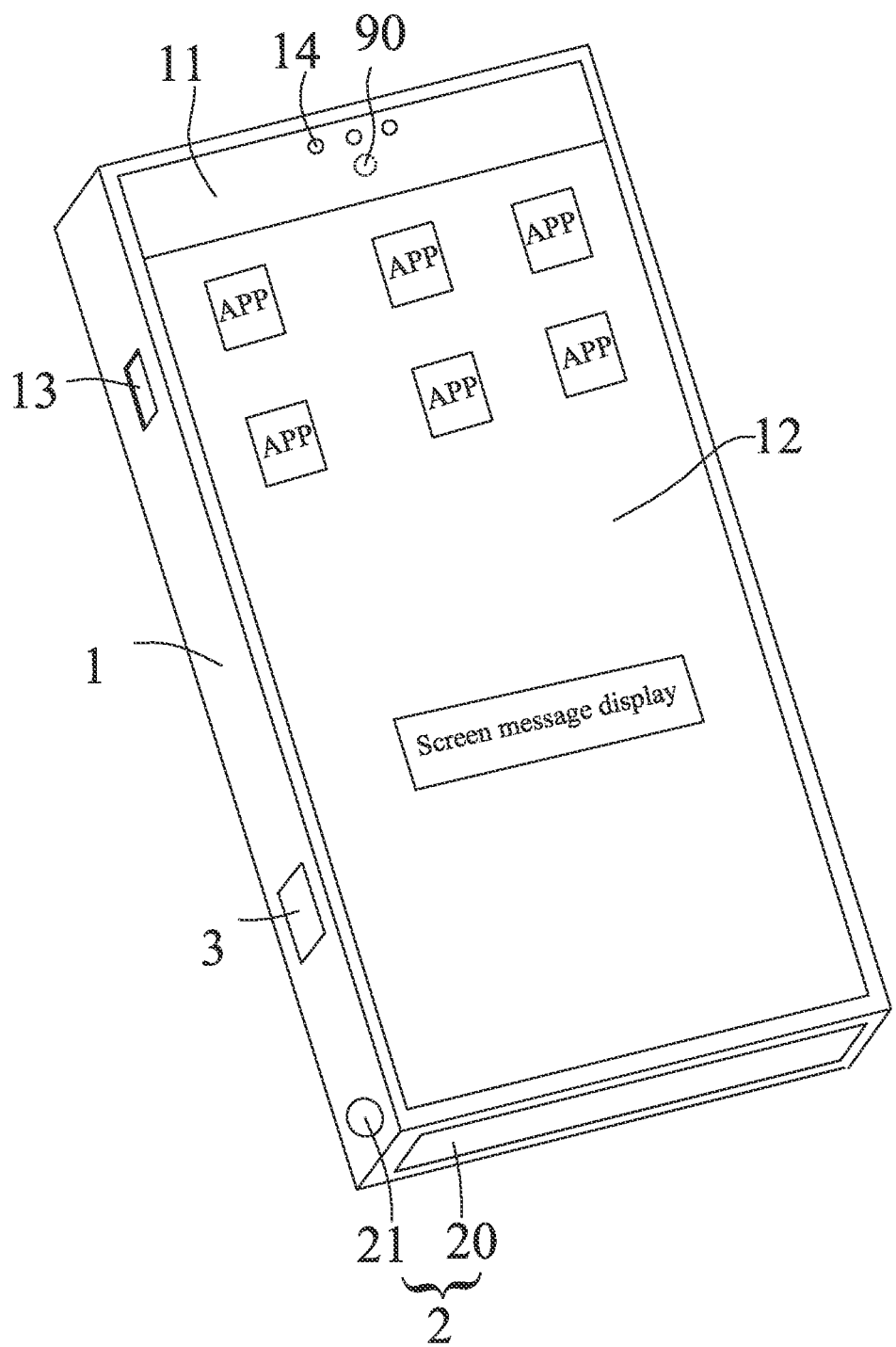
FIG. 1 is the first view of the anti-sneak shooting apparatus for a communication device with the shooting function according to one embodiment as described herein.
Figure 2:
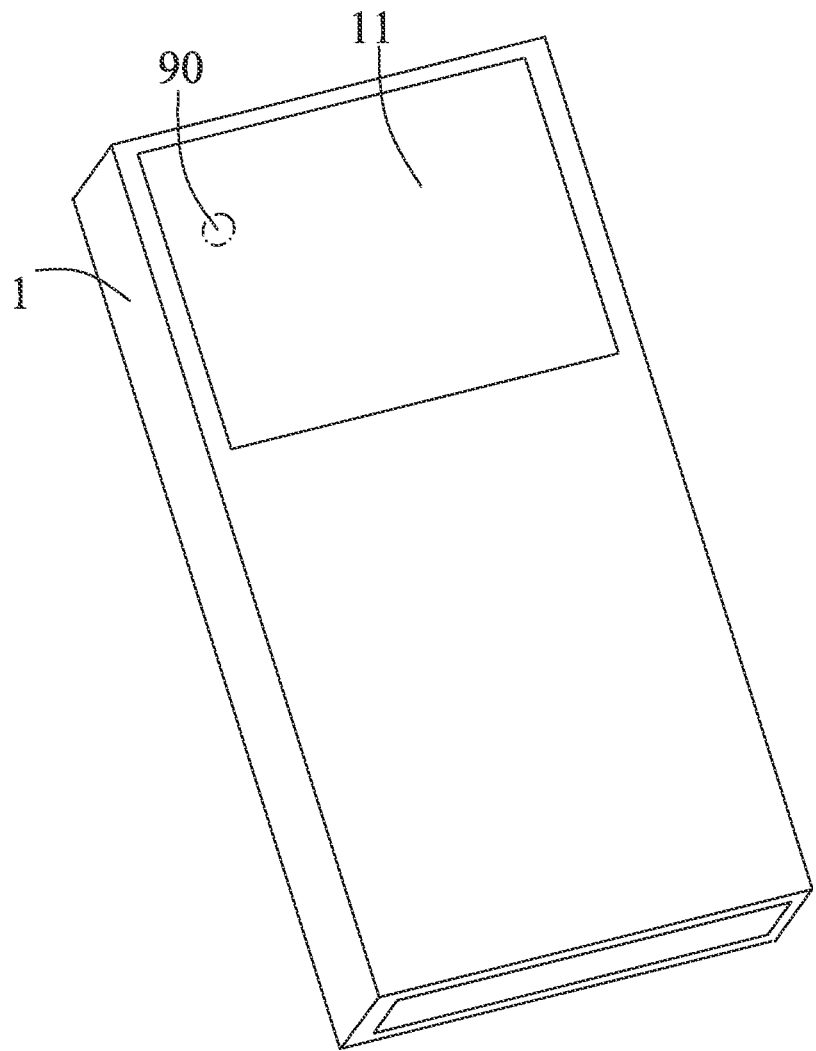
FIG. 2 is the second view of the anti-sneak shooting apparatus for a communication device with the shooting function according to one embodiment as described herein.
Figure 3:
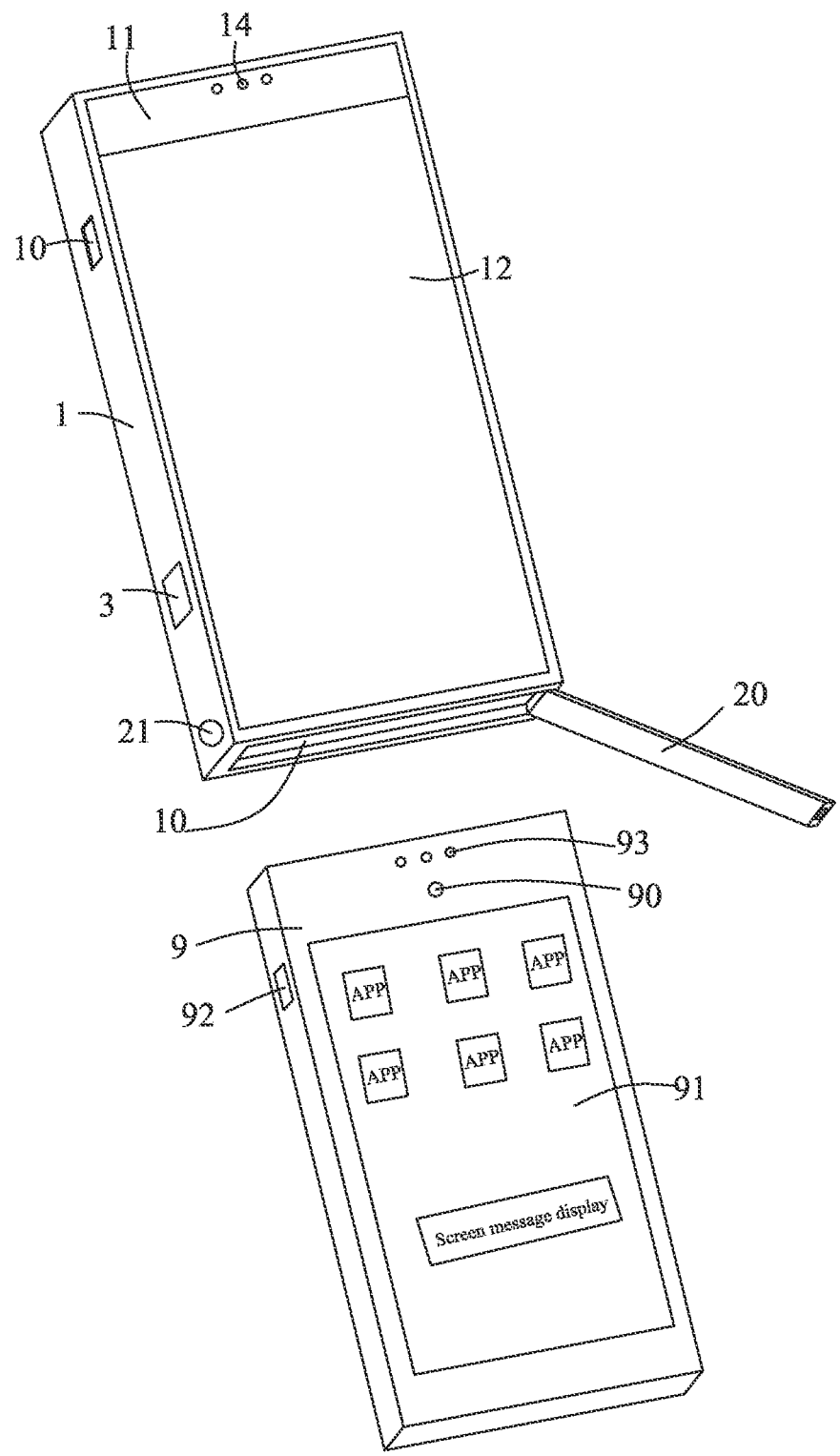
FIG. 3 is a schematic diagram for putting and removing the communication device with the shooting function into/out of the anti-sneak shooting apparatus according to one embodiment as described herein.

Referring to FIGS. 1 to 3, provided herein is an anti-sneak shooting apparatus for a communication device with shooting function. The anti-sneak shooting apparatus comprises: a case 1, a locking apparatus 2 and a tag 3 to be detected. The case 1 has a receiving cavity for receiving the communication device 9 without interfering the communication function thereof, and an opening 10 through which the communication device is put into and removed out of the case. The case 1 further has an opaque region 11 disposed thereon for aligning with the camera 90 of the communication device 9 that is put into the case. The locking apparatus 2 is disposed on the case, for locking and unlocking the opening 10. The tag 3 to be detected is disposed on the case 1 and can be detected by a preset detection system when it enters into a detection area of the preset detection system. The tag 3 can be alternative.

When the people carrying the communication device 9 goes into a place where the shooting is prohibited, he/she will be provided with the anti-sneak shooting device and asked to put his/her communication device 9 into the case 1. Then the opening 10 of the case 1 is locked by the locking apparatus 2 to avoid that the communication device 9 is abnormally removed out of the case. Since the camera 90 of the communication device 9, which is put into the case, aligns with the opaque region 11, the people could use his/her communication device 9 but cannot perform shooting, such that the sneak shooting is effectively avoided, and meanwhile the people could carry his/her communication device to the place where the shooting is prohibited. In addition, in the case that the people stay in the said place for a long period, the people could timely notice the messages and phone calls sent to the communication device (when the messages and phone calls are sent to the communication device, vibrations or rings and vibrations are generated) and timely deal with them, since the people could carry the communication device with his/her. For example, the people could ask assistance from staffs to unlock the locking apparatus 2 to remove the communication device 9 from the case and then to make a response to the messages and phone calls. The people should return the anti-sneak shooting apparatus when leaving the place where sneak shooting is prohibited. If the people do not return it back, the anti-theft tag 3 disposed on the case 1 will be detected by the detection system at the exit, thereby triggering an alarm.

The anti-sneak shooting apparatus can be reused after being fumigated, dry-cleaned or being washed and then dried. If the people do not return the anti-sneak shooting apparatus, the tag 3 (e.g., anti-theft tag or RFID tag) will be detected by a detector for anti-theft tags or RFID tags at the exit, thereby triggering an alarm.

The apparatus can be made of complex materials with anti-bacterial effect to facilitate the reuse of the apparatus.

The apparatus can be made of disposable recyclable materials. At the entrance of the place where the shooting is prohibited, the communication device is put into the apparatus and the opening of the apparatus is enclosed by heat sealing or a nylon stripe with a barb to ensure that the opaque regions cover the front and rear cameras and the transparent region covers the touchable screen of the communication device for ease of operation of the communication device. When leaving the said place, the staffs use a special tool to open the enclosed opening and then the communication device is removed out of the apparatus and the disposable apparatus is threw out. As an additional effect, the disposable apparatus is provided with an anti-theft tag disposed therein. If the said apparatus is carried out of the said place, an alarm will be triggered to remind the people to open the apparatus by the special tool. At the entrance of the said place, there is a metal detector, such that no metal tool can be brought into the said place. Thus, the enclosed apparatus cannot be opened by hand. When leaving the said place, if the staffs notice that the apparatus has been opened at the exit, it can be used as evidence to show that the people may perform sneak shooting for further action.

By using the anti-sneak shooting apparatus as described herein, the people who will go into the place where the shooting is prohibited is allowed to carry the communication device 9 with him/her into the said place and meanwhile anti-sneak shooting can be achieved without depositing the communication devices 9 in a specified location. And the people could timely notice and deal with the messages and phone calls sent to the communication device 9, thereby avoiding loss rendered due to missing of the messages or phone calls, since the communication device 9 is carried with the people who goes into the place where the shooting is prohibited. In addition, since the case 1 has a tag 3 to be detected disposed thereon, the anti-sneak shooting apparatus can be effectively collected for ease of organization of the anti-sneak shooting apparatus, rather than getting back the communication device 9 depending on the people's name at the exit of the said place, such that huge workload and chaos can be avoided.

It can be noted that, the communication function of the communication device will not be interfered when the communication device is put into the case. It can be understood that, the communication device 9 that is put into the case 1 can normally receive and even send communication signals. As one example, the case 1 is a metal case but it is not sealed. An opening area is provided on the case 1, such that the antenna of the communication device 9 has normal communication with outer space. As another example, the case 1 is made of non-metal materials that do not interfere the communication between the antenna of the communication device 9 and the outer space.

It should be noted that, the term "shooting" used in the present disclosure means taking photos or recording videos or both. The term "anti-sneak shooting" used in the present disclosure means anti-taking photos or anti-recording videos or both.

It should be noted that, in the present example, after the opening 10 of the case 1 is locked, the case 1 can be almost airtight or can be not airtight. For ease of transmission of rings of the communication device 9 that is put into the case 1 out of the case 1, the case 1 is not airtight after the opening 10 of the case 1 is locked.

It can be understood that, in the present example, the communication device 9 with shooting function may be a feature phone, a smart phone or a tablet computer, and the like, but not limited to these. The communication device 9 may have one camera 90, or a plurality of cameras 90 (which can be disposed on one side of the communication device 9, or can be disposed on each side of the communication device 9). However, regardless how the camera(s) 90 is/are disposed, the camera(s) 90 can be covered by corresponding opaque region(s) 11 of the case 1 as soon as the communication device 9 is put into the case 1 that matches the communication device 9.

It can be understood that, in the present example, when the opening 10 is locked by the locking apparatus 2, the opening 10 is partially closed, or is completely closed, provided that the communication device 9 cannot be removed out of the case 1 after the opening 10 is locked. In addition, the opaque region 11 can be completely not transparent for the shooting light used for the camera 90, or can be partially transparent, whose level can be configured to not allow the camera 90 to take clear images.

In the present example, the tag 3 can be adhered to outside of the case 1, or can be disposed within the case 1, or can be inserted into the materials for the case 1, but not limited to these.

In the present example, alternatively, the case 1 can be a hard box case, or can be a soft deformable case, but not limited to these.

As one alternative example, referring to FIGS. 1 to 3, the case 1 also has a transparent region 12 which is disposed on a position to allow the transparent region 12 to align with the display screen 91 of the communication device 9 that is put into the case 1. As such, when the communication device 9 that is put into the case 1 receives a notification (such as a message) to display on the screen, the user of the communication device 9 can review the notification through the transparent region 12 of the case 1. Therefore, the user could clearly and timely know the notification without removal of the communication device 9 out of the case 1, thereby improving the user's experience.

Further, the transparent region 12 can be made of touchable transparent materials. As such, the user could operate the touchable screen of the communication device 9 through the transparent region 12 (for example, answering the phone or reading the messages), thereby improving the user's experience. The touchable transparent materials may be touchable plastic films or touchable glass.

As another alternative example, the case 1 is provided with a displaying window (not shown) which is disposed on a position to allow the display screen 91 of the communication device 9 that is put into the case 1 to align with the displaying window. As such, when the communication device 9 that is put into the case 1 receives a notification (such as a message) to display on the screen, the user of the communication device 9 can review the notification through the displaying window of the case 1. Therefore, the user could clearly and timely know the notification. And the user could also perform the touchable operation on the display screen 91 of the communication device 9 through the displaying window of the case 1, thereby improving the user's experience.

As one alternative example, referring to FIGS. 1 to 3, the communication device 9 includes a front camera and a rear camera. The case 1 has two opaque regions 11 for respectively covering the front and rear cameras of the communication device 9 that is put into the case 1.

As one alternative example, the case 1 is an opaque case. Alternatively, the case 1 can be a soft non-metal case, such that the case 1 has a certain stretchable level to accommodate the communication device 9 with various sizes. Therefore, the anti-sneak shooting apparatus has excellent universality. In addition, the soft non-metal case 1 is ease for the user of the communication device to operate the buttons of the communication device (for example, operating the button for answering the phone).

As one alternative example, the case 1 is a transparent non-metal case, with an opaque patch (not shown) adhered to the inside of the case 1 to form the opaque region 11. As such, the opaque patch can be adhered to the position within the case 1 that corresponds to the camera 90 of the communication device 9 to form the opaque region 11. Therefore, the anti-sneak shooting apparatus has excellent universality.

As one alternative example, referring to FIGS. 1 to 3, the case 1 includes a button hole 13 which is disposed on a position to allow the button hole 13 to align with the button 92 of the communication device 9 that is put into the case 1. Therefore, the user of the communication device 9 could operate the button 92, thereby improving the user's experience.

As one alternative example, referring to FIGS. 1 to 3, the case 1 is provided with a speaker hole 14 which is disposed on a position to allow the speaker hole 14 to align with the loudspeaker hole 93 of the communication device 9 that is put into the case 1. As such, the user of the communication device 9 could clearly hear the rings or the voice from the phone.

As one alternative example, the locking apparatus 2 is an electromagnetic locking apparatus (i.e., an apparatus to perform locking and unlocking via electromagnetic means) or a mechanical locking apparatus (i.e., an apparatus to perform locking and unlocking by mechanical means such as keys or passwords, for example, a key-lock apparatus, a coded lock apparatus, or zip lock apparatus). The locking apparatus is known in the art and is not limited to the ones disclosed herein. As an illustration, in the case that the locking apparatus 2 is the one that locks the opening by using the nail catcher of the anti-theft tag, the unlocking apparatus for the locking apparatus 2 can be a magnetic nail remover that is widely used for anti-theft AM or RF hard tag or a mechanical lock remover that is widely used for anti-theft AM hard tag.

Illustratively, referring to FIGS. 1 to 3, the locking apparatus 2 includes a plate 20 and a key-lock 21. The plate 20 can be rotatably disposed at the opening 10 and rotatably connected to the case 1. A lock hole is disposed at one side with maximum rotatable radius of the plate 20 (not shown). The key-lock 21 is disposed on the case 1. When the core of the key-lock 21 is popped up, the core can align with the lock hole and insert the lock hole, thereby achieving locking.

As one alternative example, the tag 3 can be an acousto-magnetic (AM) anti-theft tag 3 (for example, 21 KHz, 58 KHz or 280 KHz acousto-magnetic anti-theft tag), or a radio frequency (RF) anti-theft tag 3 (for example, 4.0 MHz, 8.2 MHz or 10.0 MHz radio frequency anti-theft tag) or an electromagnetic (EM) anti-theft tag 3 (for example, 800 Hz, 1500 Hz or 2000 Hz electromagnetic (EM) anti-theft tag), or radio frequency identification tag 3 (for example, 13.56 MHz, 15 MHz or 812 MHz radio frequency identification tag), but not limited to these.

Figure 4:
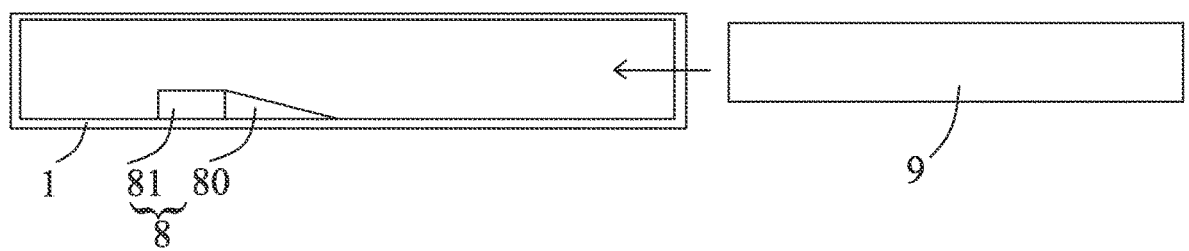
FIG. 4 is a schematic diagram showing that the communication devices is fixed by the elastic bar in the case when it is put into the case.

As one alternative example, the anti-sneak shooting apparatus further comprises a fastening apparatus disposed within the case, for fixing the communication device that is put into the case 1 so as to make the camera of the communication device 9 be accurately covered by the corresponding opaque region. As such, the camera of the communication device can be accurately and stably covered by the opaque region. As an illustration, as shown in FIG. 4, the fastening apparatus includes an elastic bar 8 disposed on the inner side of the case 1, which is not opposite to and not the same as the side on which the opening 10 is disposed. The elastic bar 8 includes an elastic slopped surface 80 and an elastic top 81. The slopped surface 80 is proximate to the opening 10. When the communication device 9 is put into the case 1 via the opening 10, the communication device 9 moves along the slopped surface 80 to the top 81, such that the communication device 9 is fixed between the top 81 and the corresponding inner side of the case 1.

Another example as descried herein provides an anti-sneak shooting apparatus for a communication device with shooting function (not shown). The anti-sneak shooting apparatus comprises a case for receiving the communication device, having an opening through which the communication device is put into and removed out of the case, a locking apparatus disposed on the case, for locking and unlocking the opening, and a tag to be detected, which is disposed on the case. The case is a non-elastic case. And the tag to be detected is alternative.

When the people carrying the communication device with him/her goes into the place where the shooting is prohibited, the staffs of the place will provide the anti-sneak shooting apparatus to each people and ask him/her to put his/her communication device into the case. Then the opening of the apparatus is locked to avoid forbidden removal of the communication device. Since the case is rigid (e.g., a case made of glass materials, hard plastic materials and the like, and the case can be transparent or opaque), the user of the communication device cannot initiate the shooting function by pressing the corresponding buttons through the case (the communication device has a touchable screen, since the case is rigid, the user cannot operate the touchable screen through the case, especially the inner side of the case is not closely proximate to the touchable screen). Therefore, the user cannot perform shooting so as to avoid sneak shooting and meanwhile allow the communication device to be carried into the place where the anti-sneak shooting is prohibited. In addition, when the user stays in the said place for a long period, if the communication device receives the messages or phone calls, the user could timely notice them (when the communication device receives the messages and phone calls, vibrations or rings and vibrations are generated) since it is allowed to carry the communication device with the user, and thus the user can timely deal with the messages or the phone calls. When leaving the place, the user needs to unlock the anti-sneak shooting apparatus under the staffs' help or by himself/herself to remove the communication device and return the said apparatus. As an additional effect, the apparatus can be reused after being fumigated, dry-cleaned or washed. If the apparatus is not returned, the anti-theft tag or RFID tag on the case will be detected by the system for detecting the anti-theft tag or RFID tag at the exit, thereby generating an alarm.

The apparatus can be made of complex materials with anti-bacteria effect to facilitate reuse thereof.

The apparatus can be made of disposable recyclable materials. At the entrance of the place where the shooting is prohibited, the communication device will be put into the apparatus and then apparatus will be enclosed by heat sealing or a nylon stripe with a barb to ensure that the opaque regions cover the front and rear cameras and the transparent region covers the touchable screen of the communication device to operate the communication device. When leaving the said place, the staffs use a specific tool to open the apparatus and then the communication device is removed and the disposable apparatus is thrown out. As an additional effect, the disposable apparatus is provided with an anti-theft tag disposed therein. If the said apparatus is carried out of the said place, an alarm will be triggered to remind the people to open the apparatus by the specific tool. At the entrance of the said place, there is a metal detector, such that no metal tool can be brought into the said place. Thus, the enclosed apparatus cannot be opened by hand. If the staffs find that the apparatus has been opened at the exit, it can be used as evidence to show that the people may perform sneak shooting for further action.

By using the anti-sneak shooting apparatus as described herein, the people who will go into the place where the shooting is prohibited is allowed to carry the communication device with him/her into the said place and meanwhile anti-sneak shooting can be achieved without depositing the communication devices in a specified location. And the people could timely notice and deal with the messages and phone calls sent to the communication device, thereby avoiding loss rendered due to missing of the messages or phone calls, since the communication device is carried with the people who goes into the place where the shooting is prohibited. In addition, since the case has a tag to be detected, the anti-sneak shooting apparatus can be effectively collected for ease of organization of the anti-sneak shooting apparatus, rather than returning the communication device depending on the people's name at the exit, such that huge workload and chaos can be avoided.

In the present example, alternatively, one side of the case which aligns with the touchable screen of the communication device that is put into the case may be made of untouchable materials. One side of the case which aligns with the touchable screen of the communication device that is put into the case may be also made of touchable materials, provided that this side is spaced from the touchable screen of the communication device that is put into the case, so as to ensure that the touchable screen cannot be touched.

It can be understood that, for the relevant structures of the anti-sneak shooting apparatus as described above and the descriptions thereof, please referring to the above description, without repeating description.

Another example provides an anti-sneak shooting system (not shown) for the communication device with shooting function, including a tag detection system and the anti-sneak shooting apparatus as described herein. The tag detection system is used for detecting the presence of the tag to be detected in the detection area.

In particular, the tag detection system is disposed at the exit of the place where shooting is prohibited. When the people leave the said place, the tag detection system can detect the presence of tag 3 in the detection area at the exit. When the tag 3 is detected by the tag detection system and an alarm is generated, it is shown that the anti-sneak shooting apparatus is not returned.

Illustratively, the tag to be detected is a radio frequency tag and the tag detection system is a RFID tag detection system which can be used for detecting the presence of the radio frequency tag and the user identification carried by such tag. The radio frequency tag can be a visiting card or a staff card with radio frequency identification function.

The foregoing is provided for illustration, and does not intend to limit the present invention. Any changes and modifications for the above embodiments come within the scope of the present invention.

The invention claimed is:

1. An anti-sneak shooting apparatus for a communication device with shooting function, comprising:
a case, for receiving the communication device without interfering communication function of the communication device, having an opening disposed thereon, through which the communication device is put into and removed out of the case; wherein the case is a rigid case which prevents a user of the communication device from initiating the shooting function by pressing a button on the communication device through pressing the case;

a locking apparatus disposed on the case, for locking and unlocking the opening; and a tag to be detected, which is disposed on the case and detected by a preset detection system when it enters into a detection area of the preset detection system.

2. An anti-sneak shooting system for a communication device with shooting function, comprising a tag detection system and the anti-sneak shooting apparatus of claim 1, wherein the tag detection system is used to detect a presence of the tag to be detected in the detection area.

3. The anti-sneak shooting system for the communication device with shooting function according to claim 2, wherein the tag to be detected is a radio frequency tag and the tag detection system is a RFID tag detection system which is used for detecting the presence of the radio frequency tag and a user identification carried by the radio frequency tag.

4. An anti-sneak shooting apparatus for a communication device with shooting function, comprising:

a case, for receiving the communication device without interfering communication function of the communication device, having an opening disposed thereon, through which the communication device is put into and removed out of the case, and an opaque region for covering a camera of the communication device that is put into the case;

a locking apparatus disposed on the case, for locking and unlocking the opening; and a fastening apparatus disposed within the case, for fixing the communication device that is put into the case within the case so as to ensure that the camera of the communication device is accurately covered by the corresponding opaque region.

5. The anti-sneak shooting apparatus for the communication device with shooting function according to claim 4, further comprising a tag to be detected, which is disposed on the case and detected by a preset detection system when it enters into a detection area of the preset detection system.

6. The anti-sneak shooting apparatus for the communication device with shooting function according to claim 5, wherein the locking apparatus is an electromagnetic locking apparatus or a mechanical locking apparatus, and the tag to be detected is an acousto-magnetic (AM) anti-theft tag, a radio frequency (RF) anti-theft tag or an electromagnetic (EM) anti-theft tag.

7. The anti-sneak shooting apparatus for the communication device with shooting function according to claim 4, wherein, the case further comprises a transparent region which aligns with a display screen of the communication device that is put into the case.

8. The anti-sneak shooting apparatus for the communication device with shooting function according to claim 7, wherein the transparent region is made of touchable transparent materials.

9. The anti-sneak shooting apparatus for the communication device with shooting function according to claim 8, wherein the touchable transparent materials are touchable plastic films.

10. The anti-sneak shooting apparatus for the communication device with shooting function according to claim 4, wherein a display window is provided on the case, which aligns with a display screen of the communication device that is put into the case.

11. The anti-sneak shooting apparatus for the communication device with shooting function according to claim 4, wherein the communication device comprises a front camera and a rear camera, the case comprises two opaque regions for respectively aligning with front and rear cameras of the communication device that is put into the case.

12. The anti-sneak shooting apparatus for the communication device with shooting function according to claim 4, where the case is an opaque and soft non-metal case.

13. The anti-sneak shooting apparatus for the communication device with shooting function according to claim 4, wherein the case is a non-metal transparent case and an opaque patch is adhered to an inner side of the case to form the opaque region.

14. The anti-sneak shooting apparatus for the communication device with shooting function according to claim 4, wherein button holes are provided on the case, for aligning with buttons of the communication device that is put into the case; and wherein a speaker hole is provided on the case, for aligning with a loudspeaker hole of the communication device that is put into the case.

15. An anti-sneak shooting system for the communication device with shooting function, comprising a tag detection system and the anti-sneak shooting apparatus of claim 5, wherein the tag detection system is used to detect a presence of the tag to be detected in the detection area.

16. The anti-sneak shooting system for the communication device with shooting function according to claim 15, wherein the tag to be detected is a radio frequency tag and the tag detection system is a RFID tag detection system which is used for detecting the presence of the radio frequency tag and a user identification carried by the radio frequency tag.

17. An anti-sneak shooting apparatus for a communication device with shooting function, comprising:

a case for receiving the communication device without interfering communication function of the communication device, having an opening disposed thereon, through which the communication device is put into and removed out of the case, wherein the case is a rigidity case which prevents a user of the communication device from initiating the shooting function by pressing a button on the communication device through pressing the case; and a locking apparatus disposed on the case, for locking and unlocking the opening.

* * * * *